United States Patent
Cogniaux (10) Patent No.: US 11,886,572 B2
(45) Date of Patent: Jan. 30, 2024

(54) METHOD TO UPGRADE A TEE TRUSTED APPLICATION TO A SERVER MODE

(71) Applicant: THALES DIS FRANCE SAS, Meudon (FR)

(72) Inventor: Geoffroy Cogniaux, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 442 days.

(21) Appl. No.: 17/278,318

(22) PCT Filed: Sep. 17, 2019

(86) PCT No.: PCT/EP2019/074832
§ 371 (c)(1),
(2) Date: Mar. 21, 2021

(87) PCT Pub. No.: WO2020/058250
PCT Pub. Date: Mar. 26, 2020

(65) Prior Publication Data
US 2021/0334362 A1    Oct. 28, 2021

(30) Foreign Application Priority Data
Sep. 20, 2018  (EP) ..................................... 18306223

(51) Int. Cl.
*G06F 21/53* (2013.01)
*G06F 9/54* (2006.01)
(Continued)

(52) U.S. Cl.
CPC .............. *G06F 21/53* (2013.01); *G06F 9/541* (2013.01); *H04L 63/0281* (2013.01); *G06F 8/61* (2013.01);
(Continued)

(58) Field of Classification Search
CPC ....... G06F 21/53; G06F 9/541; H04L 63/0281
(Continued)

(56) References Cited

U.S. PATENT DOCUMENTS 9,021,585 B1 *   4/2015  Paczkowski ............ G06F 21/53
                                                         726/25
11,416,605 B2 *  8/2022  Maximov ............... G06F 21/57
                         (Continued)

OTHER PUBLICATIONS

McGillion Brian et al.: "Open-TEE—An Open Virtual Trusted Execution Environment", 2015 IEEE TRUSTCOM/BIGDATASE/ISPA, IEEE, vol. 1, Aug. 20, 2015, pp. 400-407, XP032819636, DOI: 10.1109/TRUSTCOM.2015.400 p. 403, col. 2.

(Continued)

*Primary Examiner* — Teshome Hailu (57) ABSTRACT

Upgrade to a Trusted Application in a Trusted Execution Environment compliant to a Trusted Execution Environment standard to an as-a-server functioning by running, inside the Trusted Execution Environment, each instance of a Multi Instance/Single Session Trusted-Server Trusted Application compliant to the TEE standard in an infinite state-full loop polling a session of a Single Instance/Multi Session Trusted-Pipe Trusted Application, the single session of each of the instance of the Trusted-Server Trusted Application being adapted to perform a task as a server, said Trusted-Pipe Trusted Application being further polled by the Customer Application and opening session depending on command coming from the Customer Application.

14 Claims, 2 Drawing Sheets

(51) Int. Cl.
  *H04L 9/40* (2022.01)
  *G06F 8/61* (2018.01)
(52) U.S. Cl.
  CPC .................. *G06F 2221/033* (2013.01); *G06F 2221/2149* (2013.01)
(58) Field of Classification Search
  USPC .......................................................... 726/12
  See application file for complete search history.

(56) References Cited

U.S. PATENT DOCUMENTS

| | | | | |
|---|---|---|---|---|
| 11,704,442 B2* | 7/2023 | Maximov | ............... | G06F 21/72 |
| | | | | 726/26 |
| 2018/0176775 A1* | 6/2018 | Obaidi | .................. | H04W 76/10 |
| 2019/0340393 A1* | 11/2019 | Mo | ....................... | G06F 21/554 |

OTHER PUBLICATIONS

"Interprocess Communication (IPC), Pipes", Internet Citation, 1994, XP002332006, Retrieved from the Internet: URL:http://www.cs.cf.ac.uk/Dave/C/node23.html#SECTION002300000000000000000 [retrieved on Jun. 17, 2005] p. 1.
PCT/EP2019/074832, International Search Report, dated Nov. 4, 2019, European Patent Office, P.B. 5818 Patentlaan 2 NL—2280 HV Rijswijk.
PCT/EP2019/074832, Written Opinion of the International Searching Authority, dated Nov. 4, 2019, European Patent Office, D-80298 Munich.

* cited by examiner

METHOD TO UPGRADE A TEE TRUSTED APPLICATION TO A SERVER MODE

FIELD OF THE INVENTION

The present invention relates to a method to upgrade a Trusted Application in an Execution Environment compliant to a Trusted Execution Environment standard to an as-a-server functioning, said standard defining at least one of the following locks preventing the Trusted Application in a Trusted Execution Environment to function as-a-server:
- a Customer Application having a session opened in an instance of a trusted application enters in a blocking state immediately after having sent a Command to the Trusted Application (TA) and while the Trusted Application's Task has not finished,
- a Trusted Application cannot partially execute a Task,
- execution context of a Trusted Application is deleted between an executed task and a subsequent command (two commands/tasks) in an opened instance/session,
- a Trusted Application has to be Single Instance/Multi Session or Multi Instance/Single Session.

BACKGROUND OF THE INVENTION

The TEE's ability to offer isolated safe execution of authorized security software, known as 'trusted applications', enables it to provide end-to-end security by enforcing protected execution of authenticated code, confidentiality, authenticity, privacy, system integrity and data access rights. Comparative to other security environments on the device, the TEE also offers high processing speeds and a large amount of accessible memory.

Figure 1:
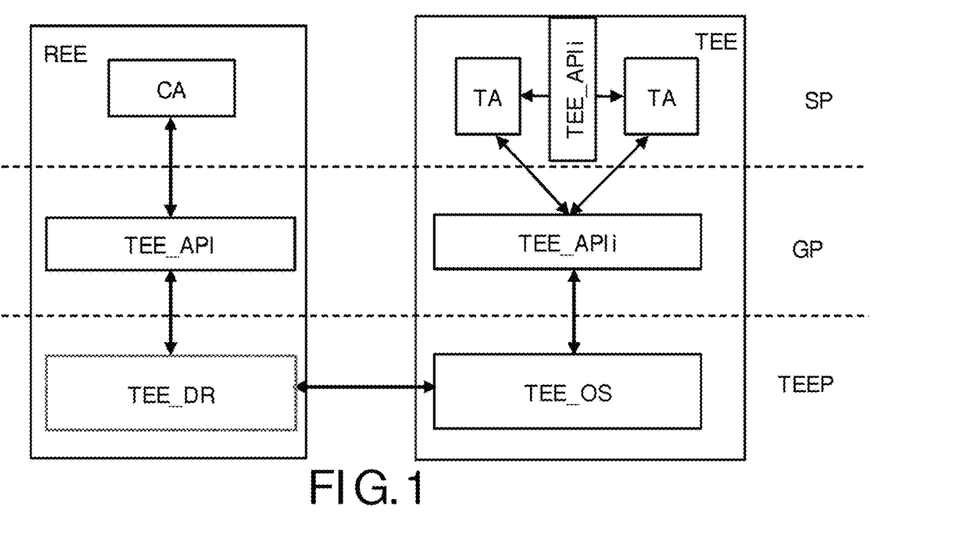
FIG. 1 represents the environment where the present invention is applied as an embodiment.

FIG. 1 schematically shows an environment where the problem solved by the invention is present and, thus, where the present invention can be advantageously implemented. This environment comprises a Rich Execution Environment REE and a Trusted Execution Environment TEE. When associated to a TEE, a REE comprises at least one Customer Application CA, a dedicated application interface TEE_API and a dedicated driver TEE_DR.

On its side, the TEE comprises an operating system TEE_OS, Trusted Applications TA compliant to the TEE standard and as many internal application interfaces TEE_APIi as needed.

The interactions between the TEE operating system TEE_OS and the TEE driver TEE_DR are defined by the TEE provider TEEP. The TEE application interfaces TEE_API and TEE-APIi are defined in the Global Platform GP specifications for a TEE.

The customer application CA and the Trusted Applications TA are defined by the solutions provider SP. A TA can be a multi instance/single session application or a single instance/multi session application.

The GP TEE specifications define steps to enable the un-secure customer application CA to invoke a TA running inside a TEE.

The customer application CA opens a session to a selected TA using its UUID. The operating system TEE_OS verifies that the TA exists and that the CA has rights to invoke it and forks either a new instance of the TA with its single session or registers a new session to an existing instance of the TA.

If the session has been successfully opened, the CA can now send commands to the TA, then goes into a blocking state while waiting for the TA response. Internally to the TEE, the operating system TEE_OS calls an InvokeCommand entry point as defined in the GP specifications and implemented in the TA to perform the requested operation called a task.

As defined by the GP TEE spec, a task has a begin and an end, the operating system TEE_OS must schedule these tasks sequentially, a TA cannot execute a new task while the current one has not finished, the operating system TEE_OS must safely reclaim the volatile memory allocated to a task for its execution including stack and registers. According to the GP specifications, other data in volatile memory like heap and static variables can be shared between tasks executed by a given session but cannot be shared between TA instances or between different sessions open to the same TA instance.

The GP specifications thus produce the following technical locks:
1. The CA is in blocking state while the TA task has not finished
2. The TA cannot partially executes a Task. For example, if the TA would need more data from the CA during its execution to complete the current operation
3. The TA does not remain active between two tasks.

The GP specifications prevents TA to execute a loop where data would be exchanged using a client-server model and where the TA would be a server with following functionalities: accept, listen, first data exchange mode like defined by BSD sockets, block send/receive both in TA side and CA side and other additional functions to support non-blocking mode: select, suspend command, resume command.

Also according to the GP specification, a CA can open several sessions to the TA within separate threads but a thread will block all others during a command invocation. Thus a TA can be easily put in a denial of service state.

Figure 2:
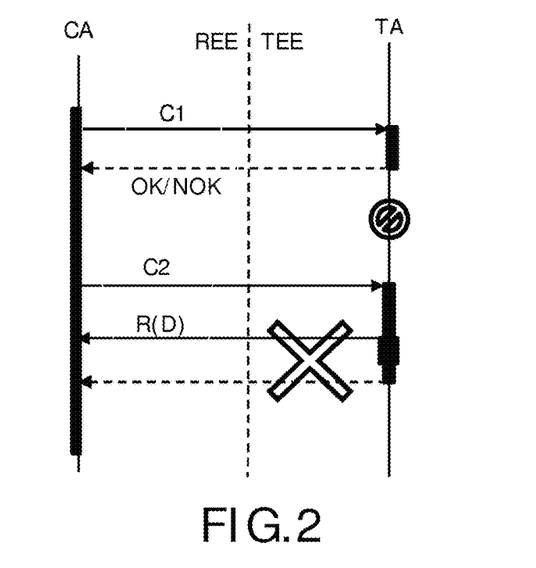
FIG. 2 shows a time diagram to illustrate some of the technical locks resulting from the application of the GP TEE specifications.

Some of these limitations are illustrated on FIG. 2 where a first command C1 triggers a task in the TA with a result OK/NOK returned to the customer application CA. Between this return and the next command C2 the TA is not active as illustrated by a ∅. Then if ever the task triggered by the command C2 needs more data R(D), there is no possibility so far to grant such a possibility with the GP specifications applied to the TA.

Such possibilities are missing in the GP specifications for TEE.

Further alternative and advantageous solutions would, accordingly, be desirable in the art.

SUMMARY OF THE INVENTION

The present invention aims at providing a Trusted Application (TA) with the possibility to function as a server for a Customer Application (CA).

By the term "as a server", it is meant that it has the behavior of a server, i.e. able to process requests and deliver data to another computer/program over the internet or a local network. It thus provides functionalities for other programs or devices in sequence and in parallel. As exposed above, this is not so far accessible to a TEE.

The present invention is defined, in its broadest sense, as a method according to the preamble where the method further runs, inside the Trusted Execution Environment (TEE), each instance of a Multi Instance/Single Session Trusted-Server Trusted Application (TA) compliant to the TEE standard in an infinite state-full loop polling a session of a Single Instance/Multi Session Trusted-Pipe Trusted Application, the single session of each of the instance of the Trusted-Server Trusted Application being adapted to perform a task as a server, while said Trusted-Pipe Trusted Application being further polled by the Customer Application and opening session depending on command coming from the Customer Application, this polling mechanism making said Trusted-Pipe Trusted Application functioning as a mailbox for the said Customer Application and the said Trusted-Server Trusted Application to exchange data asynchronously, while accomplishing their respective tasks without blocking each other and enabling the Trusted-Server Trusted Application to request further data to the said Customer Application within its currently executing task without stopping it.

By the term "as a server", it is meant that it has the behavior of a server, i.e. able to process requests and deliver data to another computer/program over the internet or a local network. It thus provides functionalities for other programs or devices in sequence and in parallel. As exposed above, this is not so far accessible to a TEE.

The invention thus builds a new execution model for standard TEE to run effectively a TA in an infinite state-full loop: the Trusted Server. This is enabled by the presence of the Trusted-Pipe functioning as a mirror for the Trusted-Server TA and for the CA and having a role of temporization, storage and management of commands.

The Trusted-Server TA can then perform tasks of the as-a-server functioning with the strong advantage that memory are isolated as soon as sessions are different. The instance thus protects the static data and sessions protect volatile data.

Therefore, the method according to the present invention enables to benefit from the security advantages of the TEE while having the possibility to run applications needing to function in a server mode. It thus enables to implement functions as non-blocking "select" and as blocking "read".

Any un-secure application can thus open a session to the server-implementation trusted application. It is useful, for example, if the TA would need more data from the CA during its execution to complete the current operation. The interface API of the TEE will define open close read functions.

With the invention each application needing an infinite loop opens a session at the Trusted-Pipe TA. The role of the pipe is to maintain the connection data available inside its different sessions of the Trusted-Pipe TA between the external CA and at least one instance of the Trusted-Server TA. This can be useful in any technical field like telecommunications, banking etc . . . .

The server mode is of a server web type waiting for connections.

According to an embodiment of the method, once a connection between the Customer Application and the Trusted-Server TA has been opened, the Trusted-Pipe TA (TP) allocates two FIFO that permit data exchanges between the Customer Application and the Trusted-Server TA (TS), one couple of FIFO being allocated for each connection between the Customer Application and the Trusted-Server TA (TS) and corresponds to one session allocated by the Trusted-Pipe TA (TP).

This embodiment implements two FIFO in the Trusted-Pipe Trusted Application is order for it to provide the intermediate mailbox functions of the invention. This is a simple and efficient to implement the invention.

According to further features of the invention, the polling commands sent either by said Trusted-Server Trusted Application or said Customer Application Gateway to Trusted-Pipe Trusted Application consist in reading and writing the allocated two FIFO where the said Customer Application polls a first FIFO filled by the Trusted-Server Trusted Application using specific commands posted to the Trusted-Pipe Trusted Application, and where the said Trusted-Server Trusted Application polls a second FIFO filled by the Customer Application using specific commands posted to the Trusted-Pipe Trusted Application.

These features correspond to a simple implementation of the invention where the two FIFO enables the temporization as offered by the invention and a buffer role as necessary for such a temporization.

Advantageously, the method comprises the preliminary steps of installing a Customer Application gateway on the client side while also installing the Single Instance/Multi Session Trusted-Pipe Trusted Application in the Trusted Execution Environment and the Multi Instance/Single Session Trusted-Server Trusted Application, said Customer Application gateway being adapted to manage communication between the Customer Application and said Trusted-Pipe Trusted Application.

Such preliminary steps enable an easy use of the invention while not modifying the CA itself but providing all necessary libraries and interfaces for the invention to be effective.

In an embodiment, said method comprises the steps of:
for the Customer Application, opening an Instance at the Trusted-Pipe Trusted Application,
for the Trusted-Pipe Trusted Application, opening several Sessions depending on the Tasks to be performed in the as-a-server functioning, each of these Sessions opening one Instance of the Trusted-Server Trusted Application,
for the Trusted-Server Trusted Application, opening a Single session for each of the multiple Instances opened by the Trusted-Server Trusted Application to execute the Tasks to be performed in the as-a-server functioning, each of these Single Sessions functioning in an infinite state-full loop polling the Trusted-Pipe Trusted Application as far as the Single Instance of the Trusted-Pipe Trusted Application is active, the multiple Single Sessions of the Trusted-Server Trusted Application enabling to perform any operation in parallel while being adapted to retrieve execution data when needed.

This sequence of steps insures the establishment of the infinite loop in the simplest way.

In an implementation, said Customer Application gateway is a proxy server waiting for remote connections or a library statically linked to a classic customer application.

Such an implementation enables the CA gateway to centralize all necessary functions to implement the invention.

It is here noted that, while claims are all dependent on claim 1, any one of those claims can be combined together to form any combination of a plurality of those claims.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

Figure 3:
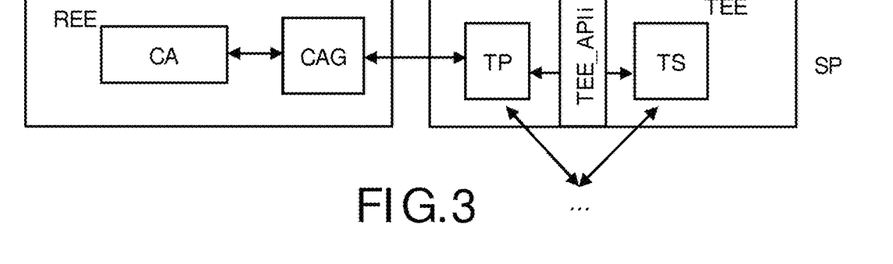
FIG. 3 shows the different entities of the invention at the level of the solutions provider.

FIG. 3 shows the different entities useful for the implementation of the invention at the level of the solutions provider where the invention is useful. Thus, for the implementation of the invention, the REE comprises a customer application gateway CAG. Typically it is either a proxy server waiting for remote connections, for example TCP/IP or a library statically linked to a classic CA.

In the TEE, a single instance/multiple sessions TEE internal service is further implemented to manage communication between the CA gateway CAG and the Trusted-Server Trusted Application. It is a Trusted Application compliant with the GP TEE specifications named Trusted-Pipe Trusted Application TP in the invention.

The Trusted-Pipe Trusted Application TP is a Single-Instance/Multi-Session TA. It implies that there will be one and only one running Trusted-Pipe TA in the TEE. The Trusted-Pipe TA use sequential command properties of a TA to implements locks on communication sessions in the Trusted-Pipe TA and to allow the CA connections to always run in non-blocking mode and/or in separate threads. The single instance/multi sessions feature of the Trusted-Pipe TA TP implies that there will be only one session per Trusted-Server TA TS instance. It also implies that sessions are memory isolated. In/out memory buffers are then protected and cannot be shared, neither for reading nor writing, between Trusted-Server TA TS instances.

At last, the Trusted-Server Trusted Application TS is a Multiple-Instances/Single-Session TA and implements a Trusted-Server model listing the functions of the server which are user-defined and are not part of the invention. It could be defined as a library where such library would export functions to read and write date from/to the CA, and the bootstrap capabilities starting the server infinite loop, and where such library would implement communication with the Trusted-Pipe TA. Any TA linked to this library could then be considered as a Trusted-Server TA.

Trusted-Server TA TS must be implemented as a Multi-Instances/Single-Session TA. Every time the Trusted-Server TA TS accepts a new CA connection, a new TA instance is forked with only one session. Again the session is memory isolated insuring the different instances not to share any memory. The Trusted-Server TA TS uses the blocking model of a TEE command invocation to run an infinite loop in a unique TEE task as defined in the GlobalPlatform TEE specification.

The task implementation, inside this loop, is able to send data to the Trusted-Pipe TA TP or to poll input Trusted-Pipe TA side without blocking other CA connections to the Trusted-Server TA TS. It allows an implementation of non-blocking "select" and blocking "read".

The Trusted-Pipe Trusted Application TP and the customer application gateway CAG communicates through dedicated interfaces TEE_API and internal TEE_APIi defined to implement a TA as a TS, and through the driver TEE_DR and the operating system TEE_OS. The invention thus defines an API on the customer side to communicate with the TS.

The interfaces are available in both Customer Application CA and Trusted-Server Trusted Application TS. Advantageously, previous authentication between the CA gateway CAG, the Trusted-Pipe and the Trusted-Server is performed.

The following functions are implemented by the interfaces: open the communication pipe established through the Trusted-Pipe TA, close the communication pipe established through the Trusted-Pipe TA, read/write to exchange data in/out through the Trusted-Pipe TA, select to retrieve how many bytes are available on the Trusted-Pipe TA pipe, IOCTL to set parameters of the communication pipe established through the Trusted-Pipe TA, comprising blocking/non-blocking, pipe size negotiation with the Trusted-Server TA TS . . . .

The select function can have function parameters. It enables to retrieve how many bytes are available for reading or how many has been written but not use by the TS yet.

The interface in the TEE_API of the customer application CA further comprises a bind function to prepare the connection with the TS, eventually using cryptographic authentication.

The interface in the TEE_APIi of the Trusted-Server Trusted Application further comprises the following functions: listen to put a standard Trusted Application in a server mode according to the invention and accept to prepare a connection to the Trusted Pipe Trusted Application TP when a new Customer Application connection is accepted eventually after a valid authentication process.

Figure 4:
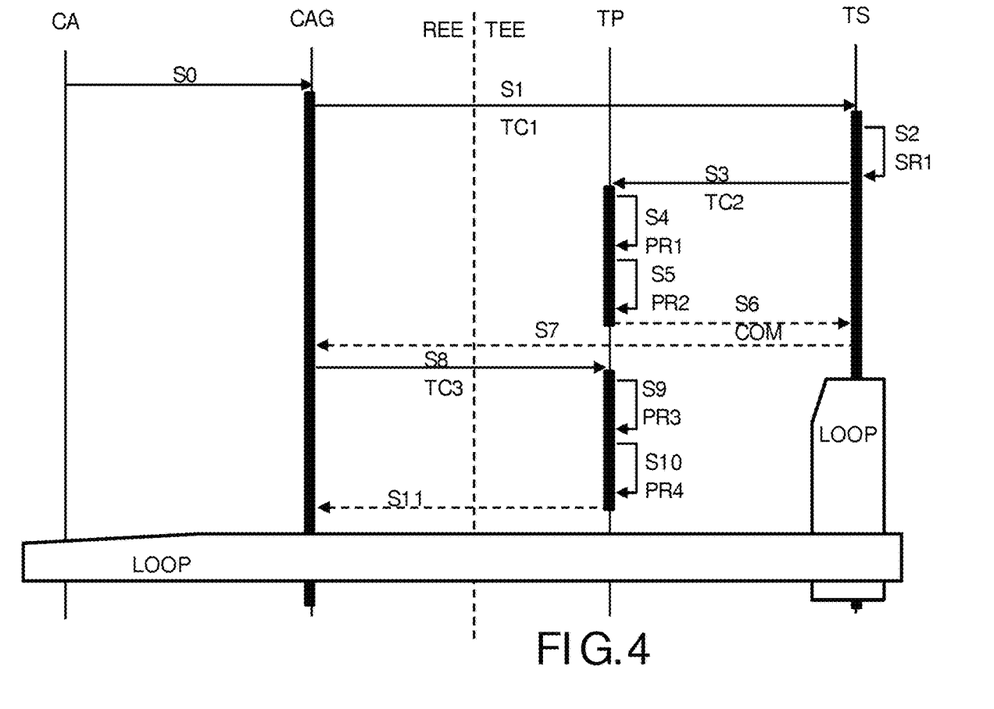
FIG. 4 is a time diagram of the initialization of the method of the invention.

FIG. 4 shows how a customer application CA opens a connection to the Trusted-Server Trusted Application TS. In a first step S0, the customer application CA connects to the CA gateway CAG. Then, in a step S1, the CA gateway CAG sends a Bind TEE command TC1 to the Trusted-Server Trusted Application TS. The binding step S2 can comprise cryptographic authentication in a TS routine SR1, or a biometric one by storing customer fingerprint.

Then in a step S3, the Trusted-Server TA TS sends a command TC2 to open a TP session to the Trusted-Pipe TA TS. The Trusted-Pipe TA TS then performs a TP routine PR1 in a step S4. In this step the TS TA identity is verified and then another routine PR2 store the customer/TS fingerprint and generate a communication descriptor COM. This communication descriptor COM is then sent to the Trusted-Server TA TS in a step S6.

This communication descriptor COM is then sent by the Trusted-Server TA TS to the CA gateway CAG in a step S7. With this communication descriptor COM, a single session is opened in the Trusted-Server TA TS for the instance bound to the customer application CA. This session enables to run the Trusted-Server TA TS in an infinite loop to perform the TA functions.

Then in a step S8, the CA gateway CAG sends an open TEE command TC3 to the Trusted-Pipe TA TP to open an instance and a session. The communication descriptor COM is sent in the open TEE command TC3. In a step S9, a TP routine PR3 verifies the communication descriptor COM in comparison with the customer fingerprint.

Then in a step S10, another TP routine PR4 associates the customer and the Trusted-Server TA TS fingerprints. The fingerprint calculation is not part of the invention but instead depends on the authentication mechanism used in the user-defined implementation of this invention. Once these two steps are performed, the Trusted-Pipe TA TP replies to the CA gateway CAG in a step S11. The CA is then able to send any command to the Trusted-Server TA TS through the single instance of the Trusted-Pipe which manages the different opened sessions, each corresponding to an instance of the Trusted-Server TA TS. The way the association between the CA, the TP and the TS is maintained is not part of the invention, but for safety reasons, it should be provided by a library implementing the invention, relying on information provided internally by the operating system of the TEE.

Figure 5:
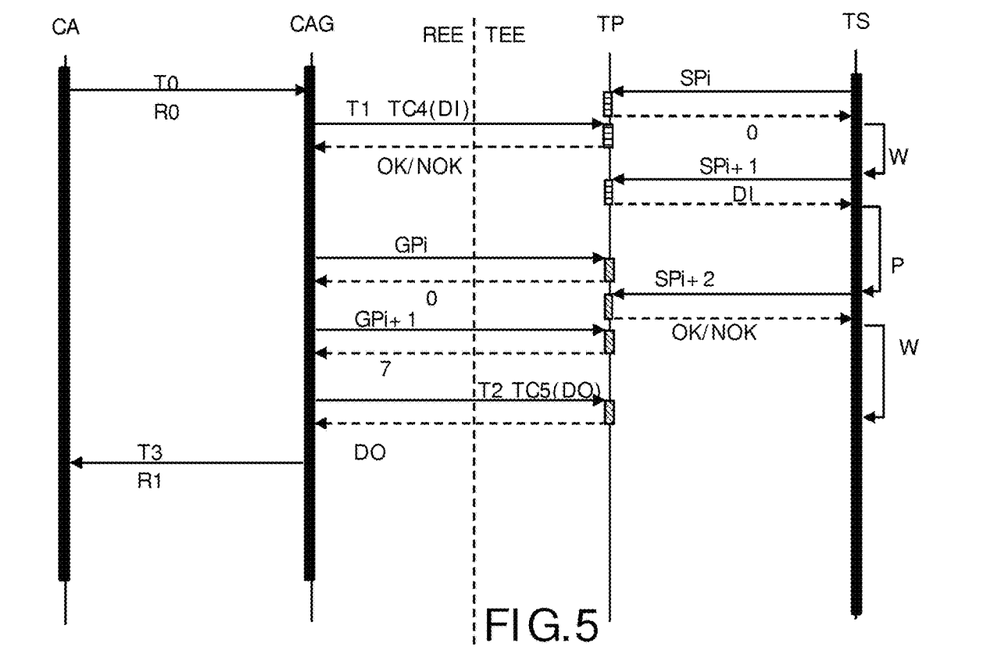
FIG. 5 shows a time diagram of the running of the method of the invention.

FIG. 5 describes the communication process between the customer application CA, the Trusted-Pipe TA TP and the Trusted-Server TA TS. The architecture is derived from a mailbox strategy. While the CA and the Trusted-Server TA TS are running their own infinite loop, they temporarily delegate Read and Write commands to a third party TA, called the Trusted Pipe TA TP. The TP permits CA and TA to exchange and request data only when they need without the need to stop the TS between every TEE commands to process, as described in the Global Platform TEE specifications.

Once the connection has been opened, the TP allocates two FIFO that permit data exchanges between the CA and the TS. One couple of FIFO is allocated for each connection between the CA and the TS and corresponds to one session allocated by the TP. Thus, a couple of FIFO is isolated from other FIFO belonging to other connections. The first FIFO will receive data from the CA and will be pooled in successive polling steps SPi by the TA TS to check if it has data to process. The second FIFO will receive data from the TA TS and will be polled by the CA in successive steps GPi to check if it has data to process. Sending data to the TP is done using a WRITE command, while a processing results in a READ command.

It is here noted that the Trusted-Server TA TS between each polling step SPi, SPi+1, is waiting W or is processing data P. This functioning in the Trusted Application is compliant with the standard and thus presents the limitations of the prior art.

To summarize, the Trusted Pipe TA TP bridges the communication between the CA and the TA TS using two FIFO buffers. The first buffer is where the CA will post data using a WRITE command and where the TS will poll for data using a SELECT or READ command. The second buffer is where the TS will post data using a WRITE command and where the CA will poll for data using a SELECT or a READ command.

To describe further the polling, and the READ and WRITE commands, an example of these different steps in a typical schedule is depicted in FIG. 5. The first FIFO writable by the CA and readable by the TS is symbolized by horizontal lines pattern rectangle. The second FIFO readable by the CA and writable by the TS is symbolized by inclined lines pattern rectangle.

Periodically, the Trusted-Server TA in the infinite loop polls the first FIFO in the Trusted-Pipe TA in steps SPi to check if it has data for it. At the first polling step SPi, no data is available, symbolized by 0 as a polling result. The Trusted-Server TA waiting for command is illustrated by reference W.

Then in a first step T0 the customer application CA wants to send a request R0 to a TEE Trusted Application which is here the Trusted-Server TA TS. For example the command R0 is "receive 5 bytes". The CA gateway CAG transforms this request R0 into a WRITE command TC4(DI) sent in a step T1, DI being data related to the command relative to an input in the Trusted-Server TA. This command TC4 is here "Write 5 bytes" and DI is thus 5 bytes. This command TC4 enters in the first FIFO in the Trusted-Pipe TA TP which returns an OK or NOK depending on the presence of an opened session.

The Trusted-Server TA TS polling the first FIFO in a step SPi+1 detects the presence of the command TC4, here "5 bytes to read", and retrieves these data DI of TC4.

During this time the CA gateway still polls the second FIFO F2 of the Trusted-Pipe TA TP in steps GPi to check if there are data to forward data to CAG. Here, 0 is returned as far as the second FIFO F2 is empty.

During this, the TS has processed data as illustrated by reference P and has prepared data to forward to CA. Data are posted in second FIFO F2 using a WRITE command here "write 7 bytes" in a step SPi+2. When the 7 bytes are set, an OK message is returned while a NOK is returned if ever 7 bytes are not yet set. In polling step GPi+1, CAG detects that the second FIFO F2 has data to be read, here 7 bytes, and then initiates a READ command TC5(DO) in a step T2 here "read 7 bytes", DO being data related to the command relative to an output from the Trusted-Server TA TS. At last, in a step T3, the CA gateway CAG sends back an answer R1 to the CA, here the 7 bytes.

As a summary, after the Trusted-Server TA is authenticated at the Trusted-Pipe, itself authenticated to the CA, the CA opens a connection to the Trusted-Server which launch an infinite loop where a Trusted-Pipe is polled. The CA can then send data to the Trusted-Server TA.

In the infinite loop, the Trusted-Server TA does not receive commands anymore as it is usual in a TEE but polls the Trusted-Pipe TA. The Trusted-Server TA then performs a task and then send or receive data. The Trusted-Server thus never stops itself and never send back the initial command of the CA as far as needed. The hand is thus not given back to the CA as long as needed.

The Trusted-Server TA itself sends commands to the Trusted-Pipe TP in its infinite loop, it also virtually sends data to the CA or retrieves data through the Trusted-Pipe TA TP.

In a normal mode for a TEE, operations must be monitored externally from the TEE.

In the Trusted-Server TA, one instance has a session opened at the Trusted-Pipe and the infinite loop runs inside this instance.

If the CA wished to close the connection, it is closed at the Trusted-Pipe TA level which will itself close the corresponding instance in the Trusted-Server TA. Of course it requires each command to be associated with a session identifier at the Trusted-Pipe TA.

With the invention, any TA needing a Trusted-Server instance can use the API/library offering the Trusted-Server functions in a polling mode including: OPEN, READ, WRITE, CLOSE, IOCLT to change communication mode (set READ and WRITE in blocking or non-blocking mode), and SELECT to have the number of available bytes and which define the blocking or not feature for read and write functions.

In the above detailed description, reference is made to the accompanying drawings that show, by way of illustration, specific embodiments in which the invention may be practiced. These embodiments are described in sufficient detail to enable those skilled in the art to practice the invention.

It is to be understood that the various embodiments of the invention, although different, are not necessarily mutually exclusive. For example, a particular feature, structure, or characteristic described herein in connection with one embodiment may be implemented within other embodiments without departing from the scope of the invention.

The invention claimed is:

1. A method to upgrade a Trusted Application in an Execution Environment compliant to a Trusted Execution Environment standard to an as-a-server functioning, said standard defining at least one of the following locks preventing the Trusted Application in a Trusted Execution Environment to function as-a-server:
   a Customer Application having a session opened in an instance of a Trusted Application enters in a blocking state immediately after having sent a Command to the Trusted Application and while the Trusted Application's Task has not finished,
   a Trusted Application cannot partially execute a Task,
   execution context of a Trusted Application is deleted between an executed Task and a subsequent command in an opened instance/session,
   a Trusted Application has to be Single Instance/Multi Session or Multi Instance/Single Session, said method comprising:
   running, inside the Trusted Execution Environment, each instance of a Multi Instance/Single Session Trusted-Server Trusted Application compliant to the TEE standard in an infinite state-full loop polling a session of a Single Instance/Multi Session Trusted-Pipe Trusted Application, the single session of each of the instance of the Trusted-Server Trusted Application being adapted to perform a task as a server,
   meanwhile polling, by the Customer Application, said Trusted-Pipe Trusted Application,
   opening a session depending on a command coming from the Customer Application,
   exchanging data asynchronously between said Customer Application and said Trusted-Server Trusted Application by the polling mechanism making said Trusted-Pipe Trusted Application function as a mailbox for said Customer Application and said Trusted-Server Trusted Application,
   wherein said Customer Application and said Trusted-Server Trusted Application accomplish their respective tasks without blocking each other and enabling the Trusted-Server Trusted Application to request data within its currently executing task without stopping it.

2. The method according to claim 1, further comprising once a connection between the Customer Application and the Trusted-Server Trusted Application has been opened, allocating, by the Trusted-Pipe Trusted Application, two FIFO that permit data exchanges between the Customer Application and the Trusted-Server Trusted Application, one couple of FIFO being allocated for each connection between the Customer Application and the Trusted-Server Trusted Application and corresponds to one session allocated by the Trusted-Pipe Trusted Application.

3. The method according to claim 2, wherein the polling commands sent either by said Trusted-Server Trusted Application to Trusted-Pipe Trusted Application consist in reading and writing the allocated two FIFO where the said Customer Application polls a first FIFO filled by the Trusted-Server Trusted Application using specific commands posted to the Trusted-Pipe Trusted Application, and where the said Trusted-Server Trusted Application polls a second FIFO filled by the Customer Application using specific commands posted to the Trusted-Pipe Trusted Application.

4. The method according to claim 1, comprising preliminary steps of installing a Customer Application gateway on the client side while also installing the Single Instance/Multi Session Trusted-Pipe Trusted Application in the Trusted Execution Environment and the Multi Instance/Single Session Trusted-Server Trusted Application, said Customer Application gateway being adapted to manage communication between the Customer Application and said Trusted-Pipe Trusted Application.

5. The method according to claim 1, wherein said method comprises the steps of:
   opening, by the Customer Application, an Instance at the Trusted-Pipe Trusted Application,
   opening, by the Trusted Pipe Trusted Application, several Sessions depending on the Tasks to be performed in the as-a-server functioning, each of these Sessions opening one Instance of the Trusted-Server Trusted Application,
   opening, by the Trusted Server Trusted Application, a Single session for each of the multiple Instances opened by the Trusted-Server Trusted Application to execute the Tasks to be performed in the as-a-server functioning, each of these Single Sessions functioning in an infinite state-full loop polling the Trusted-Pipe Trusted Application as far as the Single Instance of the Trusted-Pipe Trusted Application is active, the multiple Single Sessions of the Trusted-Server Trusted Application enabling to perform any operation in parallel while being adapted to retrieve execution data when needed.

6. The method according to claim 1, wherein said Customer Application gateway is a proxy server waiting for remote connections or a library statically linked to a classic customer application.

7. A non-transitory computer readable media comprising a library intended to be installed in a Trusted Execution Environment to upgrade any Trusted Application in the Execution Environment compliant to a Trusted Execution Environment standard to function as-a-server, where such library exports functions at the Trusted Application to read and write data from/to the Customer Application, bootstrap capabilities starting the server infinite loop at the Trusted Application and communication capabilities at the Trusted Application to communicate with the Trusted-Pipe TA, making any Trusted Application linked to this library functioning as a Trusted-Server TA, the library comprising:
   an upgrade to a Trusted Application in an Execution Environment compliant to a Trusted Execution Environment standard to an as-a-server functioning, said standard defining at least one of the following locks preventing the Trusted Application in a Trusted Execution Environment to function as-a-server:
   a Customer Application having a session opened in an instance of a Trusted Application enters in a blocking state immediately after having sent a Command to the Trusted Application and while the Trusted Application's Task has not finished, a Trusted Application cannot partially execute a Task, execution context of a Trusted Application is deleted between an executed Task and a subsequent command in an opened instance/session, a Trusted Application has to be Single Instance/Multi Session or Multi Instance/Single Session, said library running, when installed inside the Trusted Execution Environment, each instance of a Multi Instance/Single Session Trusted-Server Trusted Application compliant to the TEE standard in an infinite state-full loop polling a session of a Single Instance/Multi Session Trusted-Pipe Trusted Application (TP), the single session of each of the instance of the Trusted-Server Trusted Application being adapted to perform a task as a server, while said Trusted-Pipe Trusted Application being further polled by the Customer Application and opening session depending on command coming from the Customer Application, this polling mechanism making said Trusted-Pipe Trusted Application functioning as a mailbox for said Customer Application and said Trusted-Server Trusted Application to exchange data asynchronously, while accomplishing their respective tasks without blocking each other and enabling the Trusted-Server Trusted Application to request data within its currently executing task without stopping it.

8. A non-transitory computer readable media comprising a Trusted Execution Environment comprising:

an upgrade to a Trusted Application in an Execution Environment compliant to a Trusted Execution Environment standard to an as-a-server functioning, said standard defining at least one of the following locks preventing the Trusted Application in a Trusted Execution Environment to function as-a-server:

a Customer Application having a session opened in an instance of a Trusted Application enters in a blocking state immediately after having sent a Command to the Trusted Application and while the Trusted Application's Task has not finished, a Trusted Application cannot partially execute a Task, execution context of a Trusted Application is deleted between an executed Task and a subsequent command in an opened instance/session, a Trusted Application has to be Single Instance/Multi Session or Multi Instance/Single Session, said Trusted Execution Environment running, when installed inside the Trusted Execution Environment, each instance of a Multi Instance/Single Session Trusted-Server Trusted Application compliant to the TEE standard in an infinite state-full loop polling a session of a Single Instance/Multi Session Trusted-Pipe Trusted Application (TP), the single session of each of the instance of the Trusted-Server Trusted Application being adapted to perform a task as a server, while said Trusted-Pipe Trusted Application being further polled by the Customer Application and opening session depending on command coming from the Customer Application, this polling mechanism making said Trusted-Pipe Trusted Application functioning as a mailbox for said Customer Application and said Trusted-Server Trusted Application to exchange data asynchronously, while accomplishing their respective tasks without blocking each other and enabling the Trusted-Server Trusted Application to request data within its currently executing task without stopping it.

9. A non-transitory computer readable media comprising an upgrade to a Trusted Application in an Execution Environment compliant to a Trusted Execution Environment standard to an as-a-server functioning, said standard defining at least one of the following locks preventing the Trusted Application in a Trusted Execution Environment to function as-a-server:

a Customer Application having a session opened in an instance of a Trusted Application enters in a blocking state immediately after having sent a Command to the Trusted Application and while the Trusted Application's Task has not finished, a Trusted Application cannot partially execute a Task, execution context of a Trusted Application is deleted between an executed Task and a subsequent command in an opened instance/session, a Trusted Application has to be Single Instance/Multi Session or Multi Instance/Single Session, said upgrade to a Trusted Application running, when installed inside the Trusted Execution Environment, each instance of a Multi Instance/Single Session Trusted-Server Trusted Application compliant to the TEE standard in an infinite state-full loop polling a session of a Single Instance/Multi Session Trusted-Pipe Trusted Application (TP), the single session of each of the instance of the Trusted-Server Trusted Application being adapted to perform a task as a server, while said Trusted-Pipe Trusted Application being further polled by the Customer Application and opening session depending on command coming from the Customer Application, this polling mechanism making said Trusted-Pipe Trusted Application functioning as a mailbox for said Customer Application and said Trusted-Server Trusted Application to exchange data asynchronously, while accomplishing their respective tasks without blocking each other and enabling the Trusted-Server Trusted Application to request data within its currently executing task without stopping it.

10. The non-transitory computer readable media comprising an upgrade to a Trusted Application in an Execution Environment according to claim 9, wherein once a connection between the Customer Application and the Trusted-Server TA has been opened, the Trusted-Pipe TA allocates two FIFO that permit data exchanges between the Customer Application and the Trusted-Server TA, one couple of FIFO being allocated for each connection between the Customer Application and the Trusted-Server TA and corresponds to one session allocated by the Trusted-Pipe TA.

11. The non-transitory computer readable media comprising an upgrade to a Trusted Application in an Execution Environment according to claim 10, wherein the polling commands sent either by said Trusted-Server Trusted Application to Trusted-Pipe Trusted Application consist in reading and writing the allocated two FIFO where the said Customer Application polls a first FIFO filled by the Trusted-Server Trusted Application using specific commands posted to the Trusted-Pipe Trusted Application, and where the said Trusted-Server Trusted Application polls a second FIFO filled by the Customer Application using specific commands posted to the Trusted-Pipe Trusted Application.

12. The non-transitory computer readable media comprising an upgrade to a Trusted Application in an Execution Environment according to claim 9, comprising the preliminary steps of installing a Customer Application gateway on the client side while also installing the Single Instance/Multi Session Trusted-Pipe Trusted Application in the Trusted Execution Environment and the Multi Instance/Single Session Trusted-Server Trusted Application, said Customer Application gateway being adapted to manage communication between the Customer Application and said Trusted-Pipe Trusted Application.

13. The non-transitory computer readable media comprising an upgrade to a Trusted Application in an Execution Environment according to claim 9, wherein said method comprises the steps of:
   for the Customer Application, opening an Instance at the Trusted-Pipe Trusted Application,
   for the Trusted-Pipe Trusted Application, opening several Sessions depending on the Tasks to be performed in the as-a-server functioning, each of these Sessions opening one Instance of the Trusted-Server Trusted Application,
   for the Trusted-Server Trusted Application, opening a Single session for each of the multiple Instances opened by the Trusted-Server Trusted Application to execute the Tasks to be performed in the as-a-server functioning, each of these Single Sessions functioning in an infinite state-full loop polling the Trusted-Pipe Trusted Application as far as the Single Instance of the Trusted-Pipe Trusted Application is active, the multiple Single Sessions of the Trusted-Server Trusted Application enabling to perform any operation in parallel while being adapted to retrieve execution data when needed.

14. The non-transitory computer readable media comprising an upgrade to a Trusted Application in an Execution Environment according to claim 9, wherein said Customer Application gateway is a proxy server waiting for remote connections or a library statically linked to a classic customer application.

\* \* \* \* \*